(No Model.) F. KEMPSMITH. 6 Sheets—Sheet 1.
MILLING MACHINE.

No. 538,260. Patented Apr. 30, 1895.

Witnesses.
Inventor.
Frank Kempsmith,
By Benedict & Morsell
Attorneys.

(No Model.) 6 Sheets—Sheet 3.

F. KEMPSMITH.
MILLING MACHINE.

No. 538,260. Patented Apr. 30, 1895.

Witnesses.
C. H. Keeney
Anna V. Faust

Inventor.
Frank Kempsmith,
By Benedict and Morsell
Attorneys.

(No Model.) 6 Sheets—Sheet 4.

F. KEMPSMITH.
MILLING MACHINE.

No. 538,260. Patented Apr. 30, 1895.

Witnesses.
O. H. Keeney
Anna V. Faust

Inventor.
Frank Kempsmith,
By Benedict & Morsell
Attorneys.

(No Model.) 6 Sheets—Sheet 5.

F. KEMPSMITH.
MILLING MACHINE.

No. 538,260. Patented Apr. 30, 1895.

Witnesses.

Inventor.
Frank Kempsmith,
By Benedict & Morsell
Attorneys.

(No Model.) 6 Sheets—Sheet 6.
F. KEMPSMITH.
MILLING MACHINE.
No. 538,260. Patented Apr. 30, 1895.
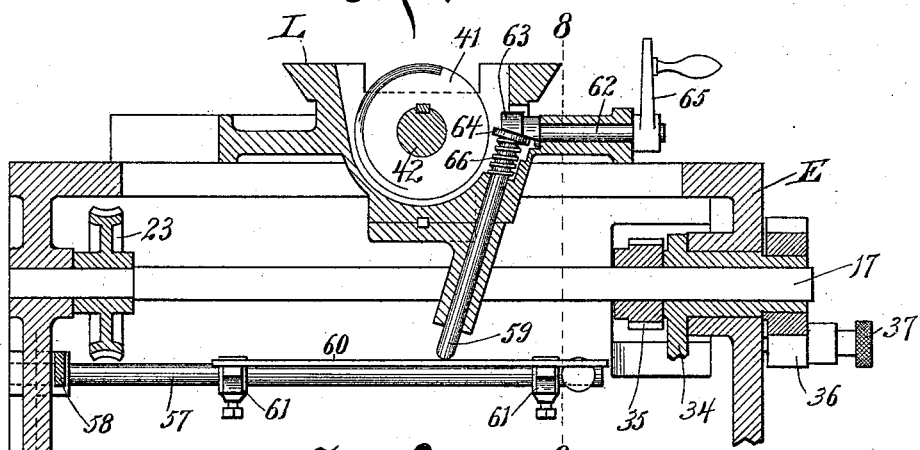
Fig. 7.
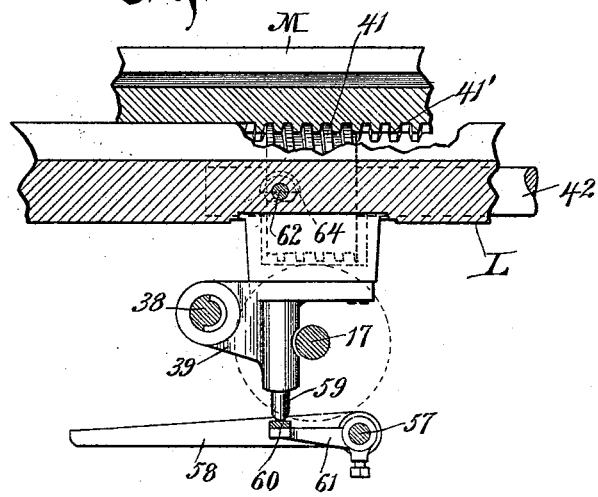
Fig. 8.
Fig. 9.
Witnesses.
O. H. Keeney
Anna V. Faust
Inventor.
Frank Kempsmith
By Benedict & Morsell
Attorneys.

UNITED STATES PATENT OFFICE.

FRANK KEMPSMITH, OF MILWAUKEE, WISCONSIN.

MILLING-MACHINE.

SPECIFICATION forming part of Letters Patent No. 538,260, dated April 30, 1895.

Application filed June 4, 1894. Serial No. 513,355. (No model.)

*To all whom it may concern:*

Be it known that I, FRANK KEMPSMITH, of Milwaukee, in the county of Milwaukee and State of Wisconsin, have invented a new and useful Improvement in Milling-Machines, of which the following is a description, reference being had to the accompanying drawings, which are a part of this specification.

My invention relates to a machine of that class known as milling machines, in which a rotary cutter or milling tool, having no movement other than its rotation, is employed to cut or reduce metal articles held to the tool on an adjustable and movable feed table.

The invention is embodied in mechanism and devices, for securing increased support and greater strength of parts for accomplishing automatic and improved action of mechanism, and generally for increasing the capacity and facility of operation of the feed table and related parts.

The invention consists of the mechanism and devices and their parts and combinations as hereinafter described and claimed, or their equivalents.

Figure 1:
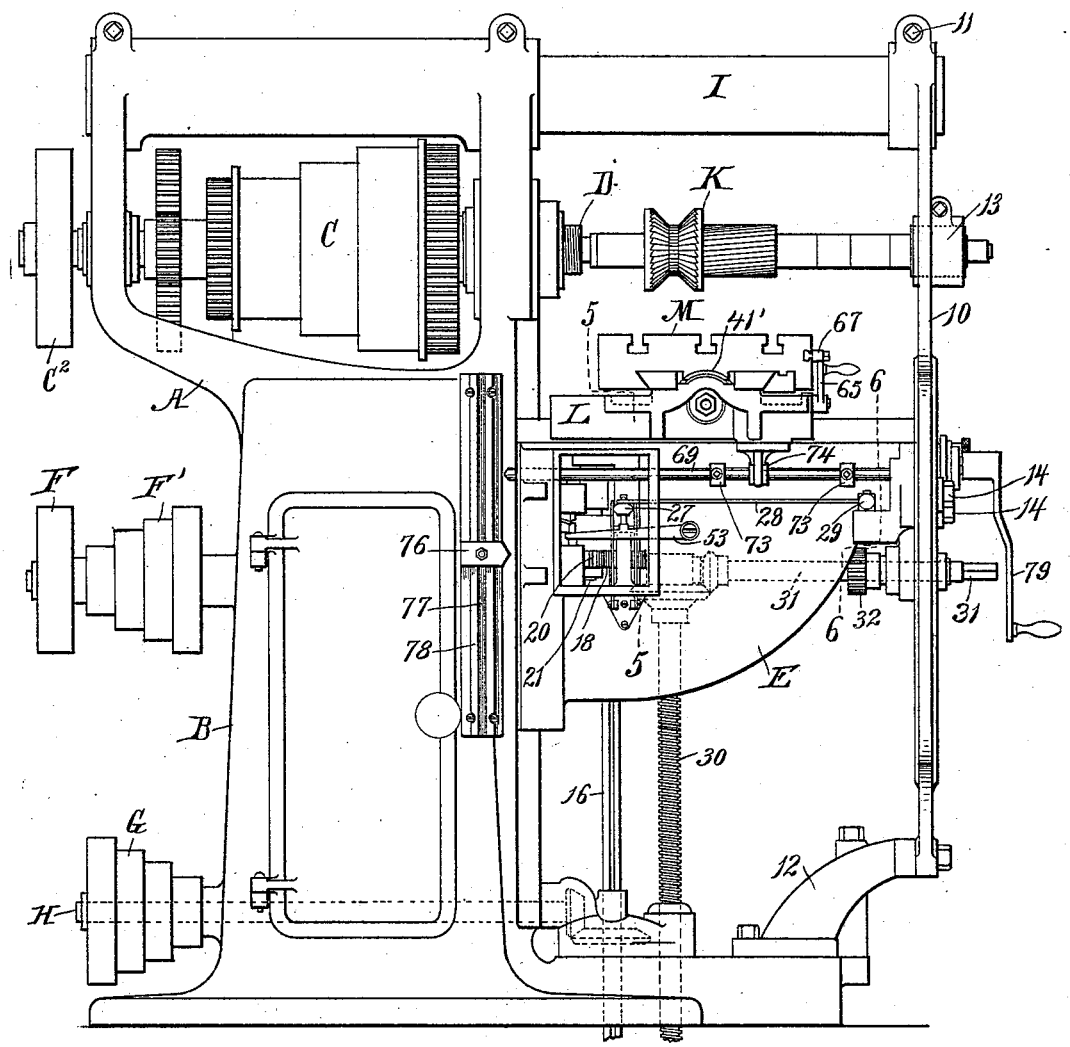
Figure 2:
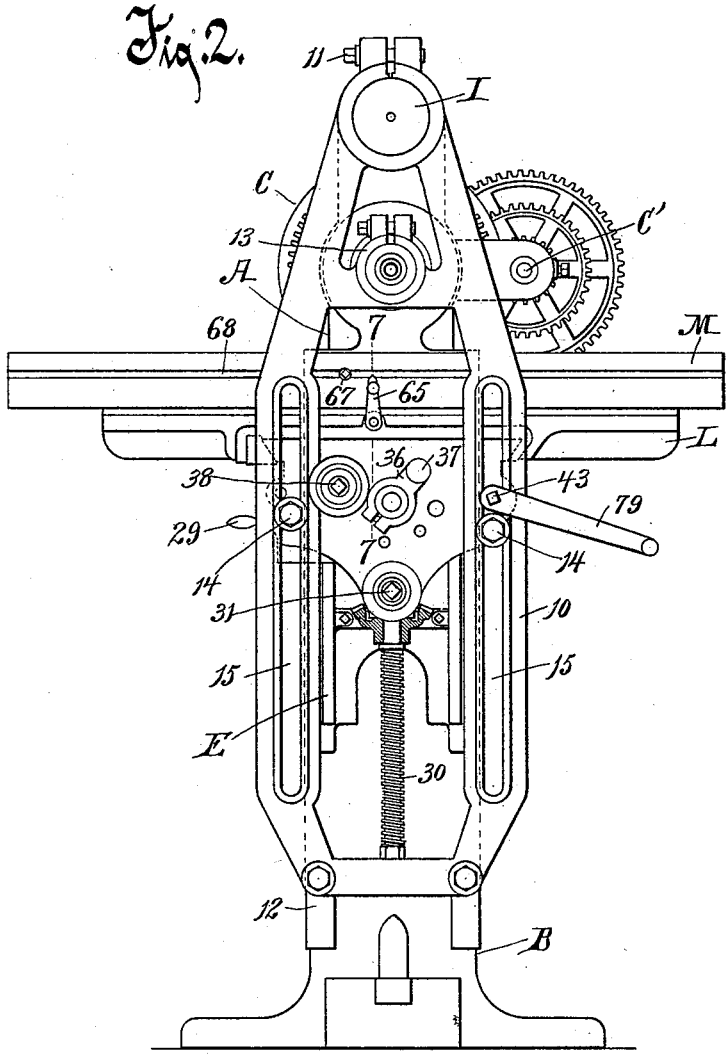
Figure 3:
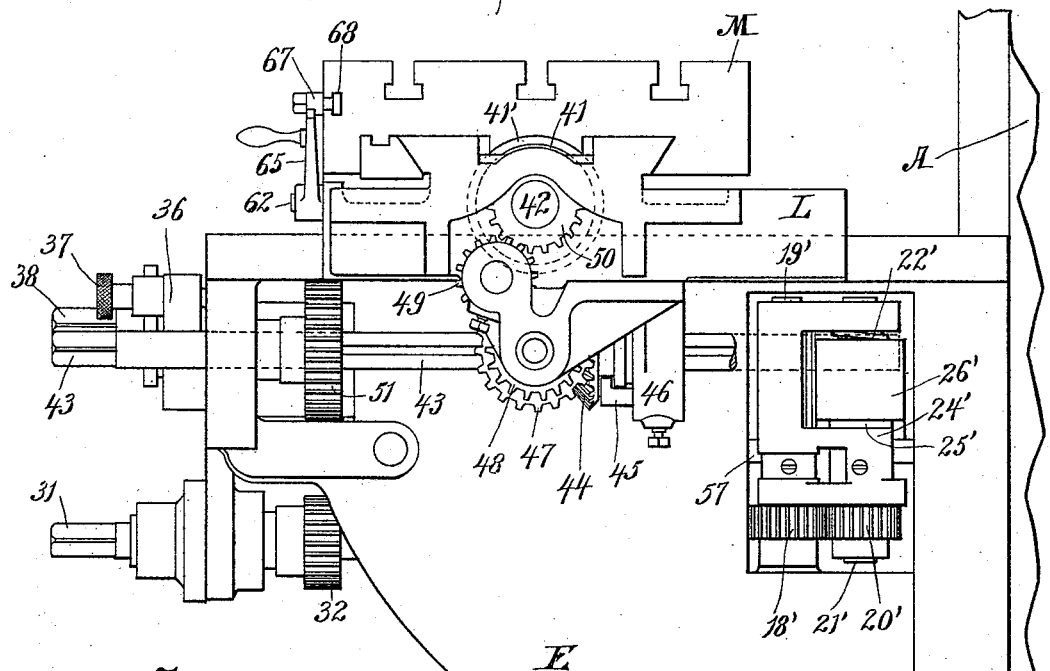
Figure 10:
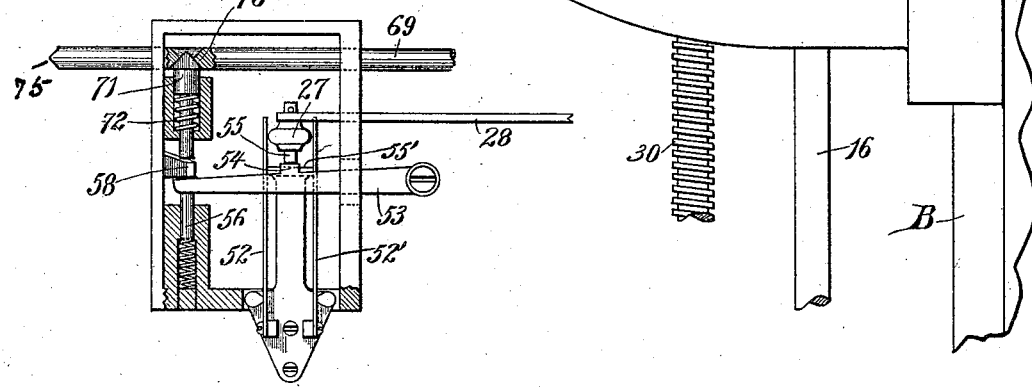
Figure 4:
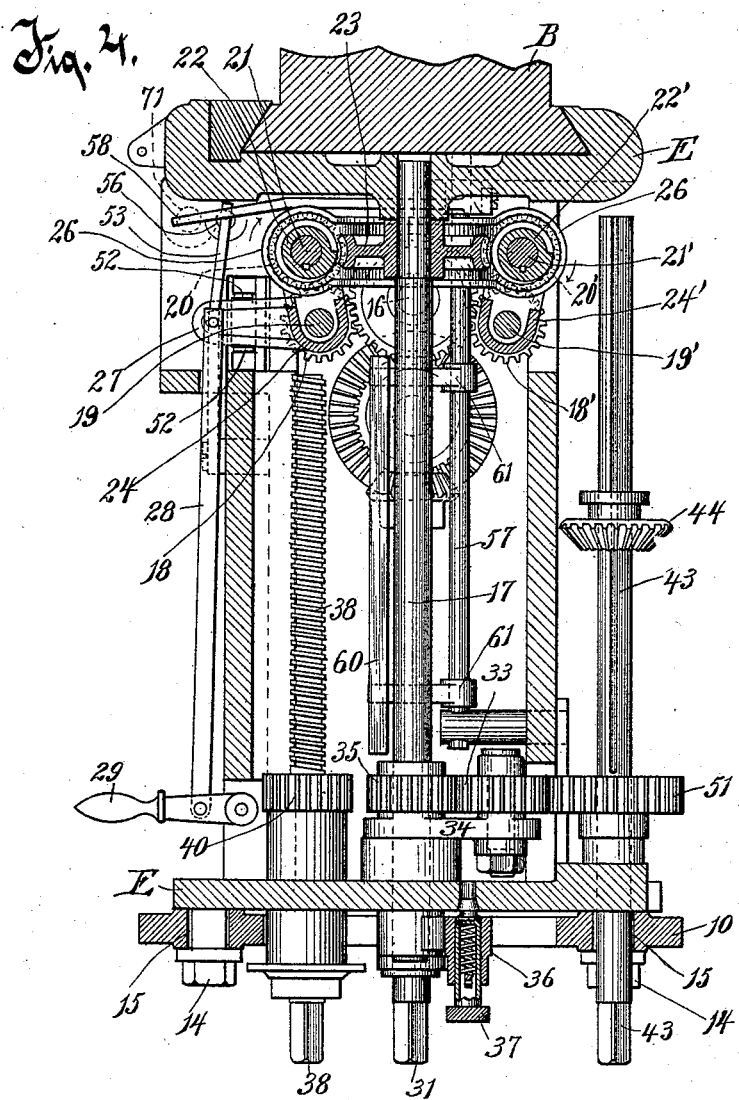
Figure 5:
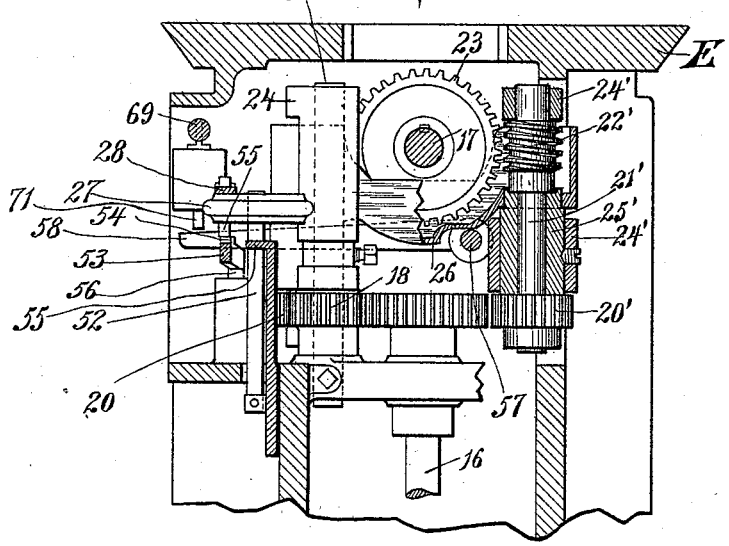
Figure 6:
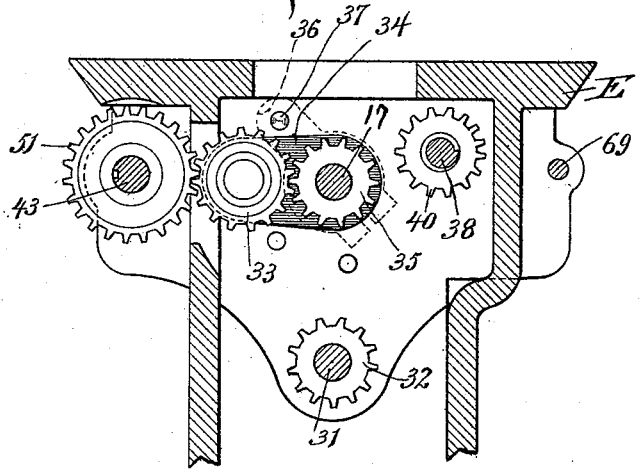

In the drawings, Figure 1 is a side elevation of the complete machine. Fig. 2 is a front elevation of the machine, parts being in section for convenience of illustration. Fig. 3 is an elevation of a portion of the machine, on the side opposite that shown in Fig. 1. Fig. 4 is a plan of the operating mechanism immediately below the saddle. Fig. 5 is a vertical section of mechanism on line 5 5 of Fig. 1, toward the left. Fig. 6 is a vertical section of mechanism on line 6 6 of Fig. 1, toward the right. Fig. 7 is a vertical section of mechanism on line 7 7 of Fig. 2, toward the right. Fig. 8 is a vertical section of mechanism on line 8 8 of Fig. 7, toward the left. Fig. 9 is a detail of a cam, seen also in Figs. 7 and 8. Fig. 10 is an enlarged view of the tripping device included in Fig. 1, parts being in section to show interior construction.

The operative mechanism is chiefly mounted directly or indirectly on a frame A, of which the hollow column B is the main support. A pulley C, mounted in the frame above the column B, is driven by a belt from the source of power supply, and through suitable speed gears communicates revoluble motion through the countershaft C', to the spindle D, which is mounted in the main frame and projects from the side thereof over the feed table on the knee E. A pulley F on an arbor projecting from the column B is driven by a belt from the pulley $C^2$ which is driven from the pulley C. The pulley F is rigid to and a part of the speed pulley F', which is belted to the counterpart speed pulley G on the countershaft H journaled in the base of the column B. A cylindrical arm I fits movably in the upper part of the frame A, and is adapted to be drawn out and thereby extended from the main frame over the feed table for attaching thereto a hanger or leg for supporting the back-center of the arbor of the milling tool, which leg in my improved machine is made to support other parts of the mechanism, as hereinafter described. The arbor of the cutting or milling tool K is inserted in the spindle D and rotates therewith, and is preferably supported at its other extremity in a back-center in the leg or hanger extending downwardly from the arm I.

The knee E is secured movably to the column B at its side, and is movable vertically by means hereinafter described. A saddle L is mounted in ways therefor on the knee E, and is movable laterally (toward and from the main frame) thereon. The feed table M is mounted in ways on the saddle L and is movable endwise (transversely of the axis of the cutter), thereon.

It has been found that on account of the great strain on both the cutter and on the table-supporting knee, that not only does the outer end of the cutter arbor need support, but also that the knee, being movable vertically, requires support to prevent its vibration or swinging on the frame. For this purpose I provide the furcate leg 10 fitted on and clamped detachably to the arm I by a holding screw 11, and secured detachably to the base of the column B by a foot piece 12 to which it is bolted, the foot piece being bolted to the base, and being practically a part thereof. The leg is provided with a journal box 13, in which the arbor of the milling tool K is back-centered and thereby supported; also the outer extremity of the knee E rests movably against the furcate parts of this leg 10, and is secured movably thereto by screw-bolts 14, 14 passing loosely respectively through one of the vertical slots 15, 15 in the leg, and turning into the knee, the heads of the bolts being adapted, when the bolts are turned in, to clamp the leg and knee together. By this means the vibration or swing of the knee is obviated, and the outer extremity of the tool-arbor is supported.

For moving the knee E vertically, for moving the saddle L laterally, for causing the table M to feed longitudinally, and for starting and stopping these actions, mechanism is employed, portions of which are common to all these operations, and other portions are individual to the particular adjustment or movement. This mechanism is as follows: A shaft 16 (Figs. 1, 3, 4 and 5) journaled and supported vertically in the knee, extends movably through a bearing therefor in the base of the column B, and is there provided with a beveled pinion loosely splined thereto, which pinion is geared to the countershaft H and is driven thereby. This shaft ordinarily revolves in one direction only, and devices are provided for gearing it at will to the shaft 17, in such manner as to rotate shaft 17 in one or the other direction as required. These devices consist of the idle pinions 18, 18', mounted on pins 19, 19' fixed upright in the frame, which pinions mesh with pinions 20, 20' fixed on the worm-shafts 21, 21', the worms 22, 22' on said shafts being of the same hand and pitch, and being adapted severally to be put in to gear at will with and at opposite sides of the worm-wheel 23 on shaft 17. The worm-shafts 21, 21' are mounted vertically respectively in the free extremities of the horizontally disposed swinging arms 24, 24', the other extremities of which arms are pivoted and supported horizontally on the pins 19, 19'. The worm shafts 21, 21' are parallel with the axes of the arms 24, 24' respectively, and swing with the arms in which they are journaled in arcs about the axes of the arms, being constantly parallel to an intermediate plane intersecting the axis of shaft 17 longitudinally. Sleeves 25, 25' fixed in the arms 24, 24' about the worm-shafts 21, 21', serve as boxes therefor, and to support the shafts vertically by means of shoulders thereon resting on the tops of the sleeves. The free extremities of the arms 24, 24' are held to co-incident movement by a link 26 fitted loosely on the sleeves 25, 25'. An arm 27 rigid to arm 24 and projecting radially therefrom, is connected by rod 28 to a lever handle 29, which handle is hinged on the frame and is adapted for shifting the worms 22, 22' severally into gear with the worm-wheel 23.

For elevating and lowering the knee E by means of the mechanism just described, a vertically disposed screw 30, on which the knee is supported vertically, turns through the fixed base of the column B. A horizontal shaft 31 journaled in the knee, is geared to the screw 30 and is provided with a pinion 32. An idle wheel 33 loose-wristed on a swinging crank-arm 34, is adapted by swinging the arm 34 into suitable position, to mesh with the pinion 32 and pinion 35 on shaft 17, thereby connecting shaft 17 operatively to the screw 30. The crank-arm 34 is pivoted in the frame, and is provided with a crank handle 36, having a spring-actuated pin 37 adapted to take into apertures therefor in the knee, and lock the arm in position.

For moving the saddle L toward the front or rear, a horizontally disposed screw 38, having bearings revolubly but not permitting endwise movement, in the knee, turns in a hanger 39 depending rigidly from the saddle, and by swinging the idle wheel 33 around the pinion 35 so as also to mesh with pinion 40 on the screw 38, that screw is rotated from shaft 17, and the saddle is moved toward the front or rear, as either the worm 22 or 22' is in gear with the shaft 17.

For causing the feed table M to travel endwise toward the right or left, a worm 41 keyed on a shaft 42, meshes with the rack 41' cut in the feed table M. The shaft 42 has bearings revolubly but not permitting endwise movement, in the saddle, and is connected actively to the shaft 17 by the means following: A shaft 43 having bearings in the knee E, has a beveled pinion 44 splined thereon, said pinion being held to movement with the saddle by a lug 45 secured detachably in a hanger 46 depending rigidly from the saddle, the lug riding in an annular groove therefor in the hub of the pinion. A beveled pinion 47 meshes with pinion 44, and a pinion 48 rigid to 47 gears with pinion 49, which pinion 49 meshes with wheel 50 on shaft 42. The pinions 47 and 48 rigid to each other, and idle pinion 49, are journaled in hangers fixed on the saddle. By swinging the idle wheel 33 around pinion 35 into mesh with pinion 51 on shaft 43, motion is communicated from shaft 17 to the shaft 43 and thence to worm 41, whereby the feed-table is made to travel to the right or left as desired.

In the drawings, (Figs. 4 and 5) the worms 22, 22' are shown out of gear with worm-wheel 23, so that when in this position neither the shaft 17 nor any mechanism driven therefrom is in operation, even when the shaft 16 is rotating. To hold these worms 22, 22' normally thus out of gear with wheel 23, two springs 52, 52' fixed on the knee, bear respectively against opposite sides of the swinging arm 27, (Figs. 1, 4 and 10) and retain the arm yieldingly in the medial position that holds the worms 22, 22' normally out of gear with worm-wheel 23.

As has been described, the worms 22, 22' are severally put into gear with the worm-wheel 23 by throwing the hand-lever 29 thereby shifting the arm 27 and the worm-carrying arms 24, 24'. To lock these arms in position with one or the other of the worms 22, 22' in gear with wheel 23, a swinging latch 53 pivoted on the knee, is provided with a projecting catch 54, the end of which bears easily against the end of a lug 55 on arm 27 when in its normal position, said latch being held up to its work by a spring actuated pin 56, supported on the knee, the construction of the latch 53 and catch 54 being such that as the arm 27 is swung to left or right for putting worms 22 or 22' into action, the catch 54 is forced up along side the lug 55 and locks the arm releasably in the position to which it has been swung. On releasing the lug 55 from the side of the catch 54, the acting spring 52 or 52' will throw the arm 27 into normal position, in which the worms 22 and 22' are out of gear with wheel 23. A stop 55' projecting from the knee rigidly between the springs 52 and 52', which stop is substantially of the same width as the arm 27, prevents the springs from throwing the arm 27 beyond its normal position. For depressing the latch 53 to release the arm 27 from catch 54, a rock-shaft 57 journaled in the knee, is provided with a radial arm 58 bearing on the latch, the rock-shaft being oscillated by the push of a rod 59 resting movably on or immediately above a plate 60, fixed parallel with the rock-shaft on the extremities of radial arms 61, 61, adjustable on the rock-shaft. The rod 59 is supported in the saddle L just above the plate 60, and so as to travel easily along on or above its surface as the saddle is moved laterally on the knee. Another rock-shaft 62, journaled in the saddle, is provided with a head 63 projecting radially in opposite directions and bearing against the disk 64 forming the head or top of the rod 59, the construction being such that the rocking of the shaft 62 in either direction, will depress the rod 59 and oscillate the shaft 57. The rock-shaft has a crank-handle 65. A spring 66 about the rod 59 under its disk-top 64, is adapted to retrieve the rod and hold the crank-handle 65 normally and yieldingly upright.

The feed of the table M, the lateral movement of the saddle and the vertical movement of the knee, when being accomplished by motion from shaft 16, may be stopped by tripping the crank-handle 65. When the table is so traveling endwise on the saddle, the crank-handle 65 is automatically tripped by a pin 67 projecting from the side of the feed-table, its path being intersected by the crank-handle when in upright position. This pin is T-headed and is adjustable along the side of the feed-table in an under-cut channel 68 therein.

When the saddle is being moved laterally or the knee vertically by motion from shaft 16, the latch 53 may be pushed down and the springs 52 or 52' put into action to stop the feed mechanism, by tripping devices as follows: A sliding bar 69 mounted in the knee, is provided with a recess 70, the ends of which longitudinally of the bar are inclined outwardly downwardly, and the beveled point of a pin 71 that fits therein and is held yieldingly up to its work by a spring 72, is arranged above and so as to be pushed by the endwise movement or tripping of the bar, down against and to depress the arm 58, which engages and carries the latch 53 down with it. The bar 69 is provided with adjustable collars 73, 73, and a hanger 74 depending from the saddle is adapted, as the saddle reaches the predetermined limit of its travel, to engage one of these collars in its path and by tripping the bar to release the latch 53 and stop the feed. The vertical adjustment or feed of the knee is also stopped by tripping the bar 69. For this purpose the end 75 is reversely beveled, and a complementary reversely beveled block 76, secured adjustably on the column B, is located in the path of the end of the bar, so as to engage it and be tripped thereby. The block 76 is secured to the column B, conveniently by a T-headed bolt, that fits in an under-cut channel 77 in a plate 78 fixed on the column.

The shafts 31 and 43 and screw 38 are faced at their outer ends to receive thereon a wrench 79, for rotating them by hand, when desired.

What I claim as my invention, and desire to secure by Letters Patent, is—

1. The combination with the main frame of a milling machine and a knee projecting horizontally therefrom and movable vertically thereon, of an integral furcate upright leg at the other end of the knee secured rigidly but detachably to the main frame below the knee and having means whereby at its upper extremity it is attachable detachably to an overhanging arm above the knee, said leg being also provided medially with vertical slots, and head screws passing loosely through the slots and turning into the knee, whereby the knee is permitted to move vertically and is stayed against vibration, substantially as described.

2. In a milling machine, the combination, with a main frame and a knee movable vertically thereon, of a shaft H journaled in the main frame, and a vertical shaft 16 journaled and supported in the movable knee and provided with a pinion splined thereto meshing with a pinion on shaft H, a shaft 17 in the knee, and means including a swinging frame and double sets of idle wheels geared together in sets interposed between shafts 16 and 17, one wheel of each set meshing constantly with a pinion on shaft 16 and other wheels of the sets being mounted in the swinging frame and thereby adapted to gear the shaft 16 to the reversibly rotatable shaft 17 at will through one or the other of the sets of idle wheels, substantially as described.

3. The combination with a shaft arranged to be driven continuously in one direction, of another shaft and means for connecting the first shaft to the second shaft operatively so as at will from the first shaft rotating in one direction, to rotate the second shaft in either direction, said means comprising two idle pinions meshing with a pinion on said first shaft, two other pinions mounted in swinging arms and in mesh with the first mentioned idle pinions, worms on the shafts of the second mentioned pinions, swinging arms carrying said last mentioned pinions and a link connecting the free extremities of the swinging arms and compelling co-incident movement thereof, the link, the arms, the pinions and the worms being so disposed that by the swinging of the arms, one or the other of the worms as desired can be put in mesh with a worm wheel on the second shaft, substantially as described.

4. As a means for gearing a shaft rotating in one direction with a second shaft so as at will to rotate said second shaft in either direction, the combination of pins in a fixed support, idle pinions axled on the pins and meshing with a pinion on the shaft rotating in one direction, swinging arms pivoted respectively on the said pins, shafts journaled in the free extremities of the swinging arms, pinions fixed on these shafts meshing with the pinions on the pins, worms on the pinion-shafts in the swinging arms, said worms being adapted to mesh severally with a worm wheel on the shaft to be driven therefrom, sleeves about the shafts in the swinging arms, and a link embracing loosely the sleeves and uniting the free extremities of the swinging arms, substantially as described.

5. In a milling machine, the combination with a vertically movable knee, a driven reversely rotatable shaft 17 having a fixed pinion thereon and journaled in the knee, a shaft 31 journaled in the knee and connected mechanically with means adapted to raise and lower the knee, a screw 38 journaled in the knee adapted to move a saddle thereon from front to rear, and a shaft 41 journaled in the knee and connected mechanically with means adapted to feed a table laterally, of an idle pinion 33 mounted in the free extremity of a swinging arm having an axis co-incident with the axis of the shaft 17, the pinion on the arm meshing with the pinion on the shaft and being adapted by being swung thereabout to mesh also with pinions on the shafts 31, 38 and 43 respectively and to communicate motion to such other shafts from the shaft 17, substantially as described.

6. In a milling machine or analogous mechanism, the combination with a driven reversely rotatable shaft (as 17) having a fixed pinion thereon, of an idle pinion 33 mounted in the free extremity of a swinging arm having an axis co-incident with the axis of the shaft, the pinion on the arm meshing with the pinion on the shaft and being adapted by being swung thereabout to mesh also with pinions on other shafts about shaft 17, a second radial arm rigid to said first arm, and a spring-actuated pin in said second arm adapted to take into a relatively permanent support and lock the swinging pinion-carrying arm in postion, substantially as described.

7. In a milling machine, the combination with a main frame and a knee movable vertically thereon, of a shaft H journaled in the main frame and driven from the power supply, a shaft 16 journaled and supported in the knee and provided with a pinion splined thereon by which it is geared to and rotates in a uniform direction with shaft H, a shaft 17 journaled in the knee, means in the knee interposed mechanically between shaft 16 and shaft 17 whereby shaft 17 is connected to shaft 16 so as to be rotatable in either direction at will from said shaft 16 running in one direction, a vertical screw supported and revoluble loosely in the knee and turning by its thread in a fixed support below the knee, a shaft 31 geared to the screw, an idle pinion, and a swinging arm on which the pinion is so mounted as constantly to be in mesh with a pinion on the reversely rotatable shaft 17 and as to be capable by swinging the arm of being put directly into mesh with a pinion on the shaft 31, substantially as described.

8. In a milling machine, the combination with a main frame and a knee movable vertically thereon, of a shaft H journaled in the main frame and driven from the power supply, a shaft 16 journaled and supported in the knee and provided with a pinion splined thereon by which it is geared to and rotates in a uniform direction with shaft H, a shaft 17 journaled in the knee, means in the knee interposed mechanically between shaft 16 and shaft 17 whereby shaft 17 is connected to shaft 16 so as to be rotatable in either direction at will from said shaft 16 running in one direction, a screw 38 journaled in the knee, a hanger rigid on the saddle through which the screw turns, an idle pinion, and a swinging arm on which the pinion is so mounted as constantly to be in mesh with a pinion on the reversely rotatable shaft 17 and as to be capable by the swinging of the arm to be put directly into mesh with a pinion on the screw 38, substantially as described.

9. In a milling machine, the combination with a main frame, a knee movable vertically thereon, a saddle movable laterally on the knee and a feed table movable endwise on the saddle, of a shaft 17 journaled in the knee and geared to a shaft in the main frame in such manner as to be driven rotatably reversely at will therefrom, a third shaft 43 journaled in the knee and provided with a pinion splined thereon and held to lateral movement with the saddle, a shaft 42 journaled in the saddle and geared to shaft 43 through the pinion aforesaid splined thereon, a worm fixed on shaft 42 and a rack in the feed table with which the worm is in mesh and through which the table is moved endwise, substantially as described.

10. In a milling machine, the combination with a vertically movable knee, a saddle movable laterally thereon, and a feed-table movable endwise on the saddle, of a shaft 43 journaled in the knee, a pinion 44 splined thereon, a lug on the saddle riding in a groove in the hub of the pinion and holding it to lateral movement co-incident with the saddle, idle pinions 47, 48 and 49, shaft 42 journaled in the saddle and driven from shaft 43 through the pinions aforesaid, a worm on shaft 42 and a rack in the feed-table gearing with the worm, substantially as described.

11. The combination with swinging pinion and worm-carrying arms and an arm 27 projecting rigidly from one of said swinging arms, of elongated flat springs 52 bearing against this projecting arm one on each side and retaining it normally in a medial position, means for swinging the arm to right or left, and a spring-actuated latch having a catch adapted to engage a lug on the projecting arm and lock the swinging arms in position when swung to the right or left of the medial spring-caused position, substantially as described.

12. In a milling machine, the combination with a swinging spring-actuated latch pivoted on the knee of the machine, of a rock-shaft 57 journaled in the knee and provided with a radial arm bearing on the latch, a plate parallel with the rock-shaft on radial arms thereon, a rod loose in the saddle the rod being disposed, moving with the saddle, to travel above and on depression to bear against the plate, and a rock-shaft in the saddle having a radially projecting head adapted by the oscillation of the rock-shaft to depress the rod, substantially as described.

13. In a milling machine, the combination with a swinging spring-actuated latch pivoted on the knee of the machine, of a rock-shaft 57 journaled in the knee and provided with a radial arm bearing on the latch, a plate parallel with the rock-shaft on radial arms thereon, a rod loose in the saddle, the rod being disposed, moving with the saddle, to travel above and on depression to bear against the plate, a rock-shaft in the saddle having a radially projecting head adapted by the oscillation of the rock-shaft to depress the rod, a crank-handle on the rock-shaft, and a pin in the side of the feed-table movable on the saddle, adapted to engage with and trip the crank-handle, substantially as described.

14. The combination with a spring-actuated latch pivoted on the knee of a milling machine, of a saddle movable on the knee, a sliding bar in the knee provided with adjustable collars thereon, a hanger on the saddle adapted as the saddle comes to the predetermined limit of its travel to engage and move or trip the bar, and a pin adapted to be forced down by an incline on the bar and thereby to depress the latch, substantially as described.

15. The combination in a milling machine with a spring-actuated latch pivoted on the vertically movable knee, of a horizontally sliding or tripping bar in the knee, a spring-supported pin adapted to be pushed down by an incline on the tripping-bar, and thereby to depress the latch, and a pin adjustable on the main frame of the machine adapted by an incline to trip the bar when the vertically moving knee brings the bar opposite the pin, substantially as described.

In testimony whereof I affix my signature in presence of two witnesses.

FRANK KEMPSMITH.

Witnesses:
ARTHUR L. MORSELL,
ANNA V. FAUST.